(12) United States Patent
Scott et al.

(10) Patent No.: US 11,345,307 B2
(45) Date of Patent: May 31, 2022

(54) TORSION SHAFT, SEAT BELT RETRACTOR ASSEMBLY AND ASSOCIATED METHODS

(71) Applicant: Ford Global Technologies, LLC, Dearborn, MI (US)

(72) Inventors: Tim Scott, Benfleet (GB); Paul Mark Marable, Rayleigh (GB); Barry Grindle, Saffron Walden (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/145,735

(22) Filed: Jan. 11, 2021

(65) Prior Publication Data

US 2021/0213908 A1    Jul. 15, 2021

(30) Foreign Application Priority Data

Jan. 13, 2020   (GB) ...................................... 2000456

(51) Int. Cl.
*B60R 22/34* (2006.01)
*B60R 22/36* (2006.01)

(52) U.S. Cl.
CPC ............ *B60R 22/36* (2013.01); *B60R 22/341* (2013.01)

(58) Field of Classification Search
CPC .............. B60R 2022/282; B60R 22/28; B60R 22/3413; B60R 22/34; B60R 2022/287; B60R 22/341; B60R 22/36
See application file for complete search history.

(56) References Cited

U.S. PATENT DOCUMENTS

| 6,206,315 | B1 | 3/2001 | Wier | |
|---|---|---|---|---|
| 2006/0124793 | A1* | 6/2006 | Keller | ................. B60R 22/3413 242/382 |
| 2008/0054616 | A1* | 3/2008 | Rogers | ................... B60R 22/46 280/805 |

(Continued)

FOREIGN PATENT DOCUMENTS

| EP | 3897840 A1 | 2/1999 |
|---|---|---|
| EP | 1245465 A1 | 10/2002 |

(Continued)

OTHER PUBLICATIONS

He et al., "Theoretical Design and Performance Improvement of the Torsion Bar in Constant Force Retractors", SAE Technical Paper 980352, 1998, https://doi.org/10.4271/980352 - Abstract only.

(Continued)

*Primary Examiner* — Paul N Dickson
*Assistant Examiner* — Maxwell L Meshaka
(74) *Attorney, Agent, or Firm* — Frank A. MacKenzie; Bejin Bieneman PLC

(57) ABSTRACT

A torsion shaft for a seat belt retractor assembly, the torsion shaft being connectable at a first location to a spool for receiving a seat belt and connectable at a second location to a locking mechanism, the first and second locations being spaced apart along a length of the torsion shaft, wherein the torsion shaft is configured to deform when a torsion force is applied between the first and second locations during an impact event, wherein the torsion shaft comprises a cavity and a fluid is provided in said cavity so as to support the torsion shaft as the torsion shaft deforms during the impact event.

20 Claims, 2 Drawing Sheets

(56) References Cited

U.S. PATENT DOCUMENTS

2009/0101744 A1* 4/2009 Gentner .............. B60R 22/3413
                                                    242/407
2019/0054893 A1* 2/2019 Vo ........................... B60R 22/38
2020/0307508 A1* 10/2020 Arad, I ............... B60R 22/3413

FOREIGN PATENT DOCUMENTS

GB          2326851 A  *  1/1999   ......... B60R 22/3413
KR     1020130008703 A      1/2013

OTHER PUBLICATIONS

UK Search Report dated Jun. 24, 2020.

* cited by examiner

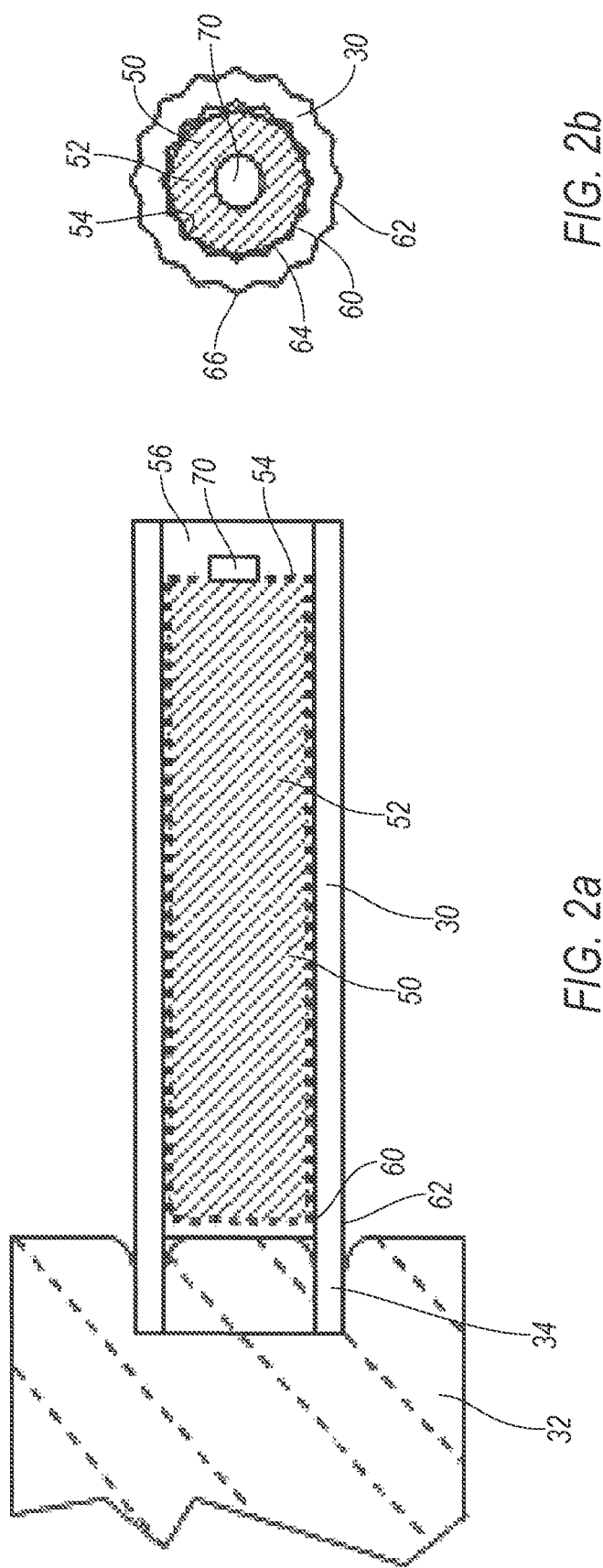

TORSION SHAFT, SEAT BELT RETRACTOR ASSEMBLY AND ASSOCIATED METHODS

CROSS-REFERENCE TO RELATED APPLICATION

This patent application claims priority to United Kingdom Application No. GB 2000456.0 filed on Jan. 13, 2020, which is hereby incorporated by reference in its entirety.

TECHNICAL FIELD

The present disclosure relates to a torsion shaft, a seat belt retractor assembly and associated methods and particularly although not exclusively relates to a torsion shaft comprising a cavity in which a fluid is provided so as to support the torsion shaft as the torsion shaft deforms during the impact event.

BACKGROUND

Constant force seat belt retractors are used to provide nearly constant belt restraint forces during a crash. There are numerous designs to provide this constant force retraction and a torsion bar is one such design. A metal bar between the seat belt web spool and the retractor lock mechanism is designed to take the belt load in the torsional mode then yield at a pre-set load level. This keeps the belt load at that determined level for a certain amount of seat belt pay out. However, it may be desirable to adjust the load profile as the torsion bar deforms.

STATEMENTS OF DISCLOSURE

According to an aspect of the present disclosure, there is provided a torsion shaft for a seat belt retractor assembly, the torsion shaft being connectable at a first location to a spool for receiving a seat belt and connectable at a second location to a locking mechanism, the first and second locations being spaced apart along a length of the torsion shaft, wherein the torsion shaft is configured to deform when a torsion force is applied between the first and second locations during an impact event, wherein the torsion shaft comprises a cavity and a fluid (such as a liquid, gel, gas or any other fluid) is provided in said cavity so as to support the torsion shaft as the torsion shaft deforms during the impact event.

There may be provided a vent configured to open as the torsion shaft deforms during the impact event and restrict flow of the fluid. The vent may substantially prevent the fluid from leaking out when the vent is closed. The vent may comprise a pressure sensitive opening that opens, e.g. when a pressure of the fluid exceeds a threshold value. Alternatively, the vent may be opened by a remotely triggered device, e.g. such as a pyrotechnic cap. The vent may be configured to close when the pressure of the fluid is lower than the threshold value, e.g. when pressure returns to below threshold value. For example, the vent may comprise a sprung valve closure. The vent may be configured such that the threshold value is adjustable. In an alternative arrangement, the vent may remain open after the vent has been opened. For example, the vent may comprise one or more frangible portions and the vent may burst open when the pressure of the fluid exceeds a threshold value.

The viscosity of the fluid and/or a size of the vent may be selected to provide a desired flow rate of fluid through the vent. For example, the viscosity of the fluid and/or the size of the vent may be selected to permit buckling (e.g. early buckling) of the torsion shaft after the impact event and to subsequently support the torsion shaft during further deformation. In particular, the viscosity of the fluid and/or the size of the vent may be selected such that the support to the torsion shaft progressively increases or decreases as the torsion shaft deforms.

The vent may be provided on a wall of the torsion shaft, e.g. on a side wall or an end wall. Alternatively, the vent may be provided on a wall of a container. The container may be provided in the cavity and the fluid may be held in said container. The container may be a flexible bladder. Alternatively, the container may be rigid or semi-rigid.

The container may have one or more ribs to locate the container with respect to an internal surface at least partially defining the cavity. A filler material, such as foam, may be provided in a space between the container and an internal surface at least partially defining the cavity. The ribs and/or filler material may reduce relative movement of the container and the torsion shaft and may thus reduce rattling.

The torsion shaft may be substantially tubular. The cavity may extend along a length of the torsion shaft. The container may also extend at least partially along the length of the cavity.

The torsion shaft may comprise an opening at a first end. The opening may lead to the cavity. The container may slot into the cavity through the opening. The torsion shaft may also have an end cap, e.g. at the opening. The end cap may hold the fluid in place, e.g. in the event that the fluid is not held in the separate container.

The torsion shaft may have a circular, e.g. substantially circular, cross-section. For example, inner and/or outer surfaces of the torsion shaft may have a circular cross-section. However, it is also envisaged that the torsion shaft may have a non-circular cross-section. For example, inner and/or outer surfaces of the torsion shaft may have a non-circular cross-section. In particular, the torsion shaft may have longitudinally extending projections, e.g. ribs, on an internal surface and/or an external surface. By way of example, the inner and/or outer surfaces of the torsion shaft may have a star profile (such as Torx®) with a plurality of projections.

According to an aspect of the present disclosure, there is provided a seat belt retractor assembly comprising the aforementioned torsion shaft, the spool and the locking mechanism.

The seat belt retractor assembly may further comprise a housing or boss at a second end of the torsion shaft. The boss may receive or be part of the spool or locking mechanism. The boss may connect to both internal and external surfaces of the torsion shaft.

According to an aspect of the present disclosure, there is provided a seat belt assembly comprising the aforementioned seat belt retractor assembly.

According to an aspect of the present disclosure, there is provided a method comprising installing, e.g. retrofitting, the aforementioned torsion shaft into a seat belt retractor assembly.

According to an aspect of the present disclosure, there is provided a method for absorbing impact energy on a vehicle occupant, the method comprising:

providing a seat belt retractor assembly having a spool for winding and unwinding a seat belt, a locking mechanism, and a torsion shaft provided in the load path from the spool to the locking mechanism;

permitting the torsion shaft to deform when a torsion force is applied during an impact event; and supporting the torsion shaft with a fluid provided in a cavity of the torsion shaft as the torsion shaft deforms during the impact event.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIGS. 2a and 2b (collectively FIG. 2) are schematic side and end views respectively showing a torsion shaft according to an example of the present disclosure.

DETAILED DESCRIPTION

Figure 1:
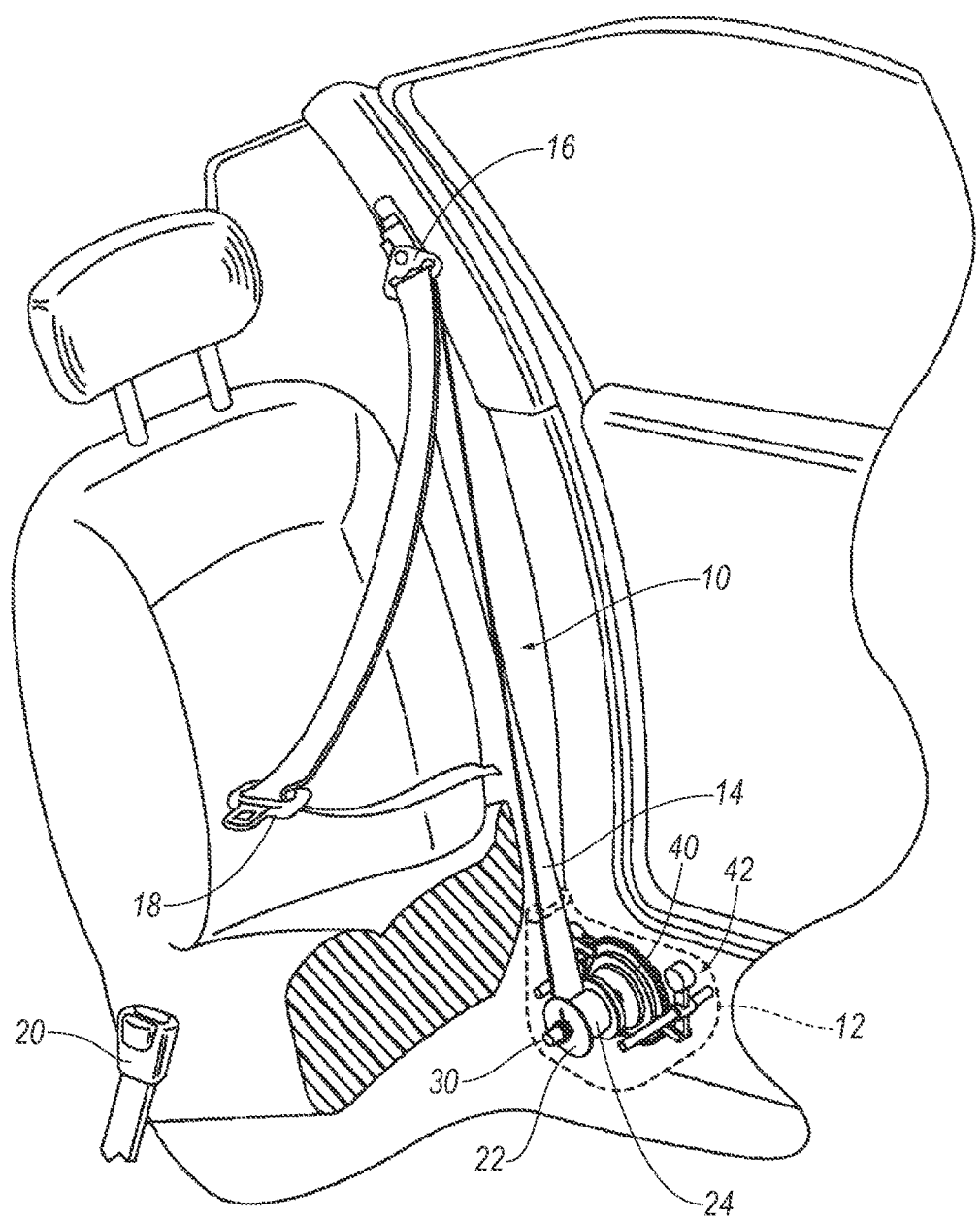
FIG. 1 is a perspective view showing a seat belt assembly comprising a seat belt retractor assembly and torsion shaft according to an example of the present disclosure.

FIG. 1 illustrates a seat belt assembly 10 according to an example of the present disclosure. The seat belt assembly 10 comprises a seat belt retractor assembly 12. The seat belt retractor assembly 12 operates to wind and unwind a seat belt 14 as the vehicle occupant pulls out and releases the seat belt 14. The seat belt retractor assembly 12 operates to take up slack in the seat belt 14; and during periods of rapid deceleration, for example a collision, to lock and prevent extraction of the seat belt 14. As illustrated, the seat belt 14 passes through a D-ring 16 and a tongue 18. The tongue 18 is freely slidable along the seat belt 14 and connects the seat belt 14 to a buckle 20. The end of the seat belt 14, opposite of the retractor assembly 12, is fixed or anchored to the base/frame of the vehicle. As illustrated, the seat belt retractor assembly 12 is mounted to the vehicle body near the B-pillar. The foregoing description of a seat belt assembly 10 is illustrative; the seat belt retractor assembly 12 according to the present disclosure can be used in other types of seat belt assemblies using seat belt retractors.

Referring still to FIG. 1, the seat belt retractor assembly 12 comprises a reel or spool 22 having a cylindrical centre portion 24 defining an axial through-bore or hole. The seat belt 14 wraps around the centre portion 24 of spool 22. Radially extending flanges are provided at ends of the centre portion 24 to guide the seat belt 14 during winding and unwinding of the seat belt 14. The spool 22 is secured to a torsion shaft 30 extending through the axial hole of the spool 22. The torsion shaft 30 rotates with the spool 22 as it winds or unwinds the seat belt 14. A first end of the torsion shaft 30 is secured to the spool 22 and a second end of the torsion shaft is secured to a disc 40 of a locking mechanism 42. The first and second ends are spaced apart along a length of the torsion shaft 30. As such, the torsion shaft 30 is provided in the load path from the spool 22 to the locking mechanism 42. The torsion shaft 30 is configured to deform when a torsion force is applied between the first and second ends during an impact event.

The locking mechanism 42 may comprise a pawl assembly that operates to engage a plurality of gear teeth on an outer peripheral edge of the disc 40. Should the vehicle come to a sudden stop inertia causes a pawl to engage the gear teeth on the disc 40 preventing rotation of the disc 40. Other types of inertia locks may also be used. For example, electronic clutches or lockup devices receiving a signal from various vehicle sensors may also positively couple or connect to the disc 42.

A biasing mechanism operates to provide a retraction force on the seat belt 14. The biasing mechanism may comprise a spring (such as a torsion spring), an electric motor for rotating the spool 22 in a winding or unwinding direction, or any other type of biasing mechanism.

Referring now to FIG. 2, the torsion shaft 30 comprises a space or cavity 50 (e.g. an internal cavity). A fluid 52 (such as a liquid, gel, gas or any other fluid) is provided in said cavity 50 and the fluid supports the torsion shaft 30 as the torsion shaft deforms during the impact event. For example, as the torsion shaft 30 deforms, the internal volume of the cavity 50 may change and the fluid 52 in the cavity may resist such change.

The fluid 52 may be provided in the cavity 50 directly or the fluid may be held in a separate container 54 within the cavity 50. The container 54 may be provided in the cavity 50 and the fluid 52 may be held in said container. The container 54 may be formed of a flexible bladder. Alternatively, the container 54 may be rigid or semi-rigid.

As depicted, the torsion shaft 30 may be substantially tubular. The cavity 50 may extend along a length of the torsion shaft 30. The container 54 may also extend at least partially along the length of the cavity. The torsion shaft 30 may comprise an opening 56 at one end. The opening 56 may lead to the cavity 50 and the container 54 may slot into the cavity 50 through the opening. The torsion shaft 30 may also have an end cap (not shown), e.g. at the opening 56. The end cap may hold the container 54 or fluid in place, e.g. if the fluid is held directly in the cavity 50 and not by the separate container.

The seat belt retractor assembly 12 may further comprise a housing or boss 32 that connects to an end of the torsion shaft 30. The boss 32 may connect to (e.g. receive or be part of) the spool 22 or locking mechanism 42. The boss 32 may have a circumferential groove 34 to receive the tubular shaft 30 and connect to both an inner surface 60 and an outer surface 62 of the torsion shaft 30. Connecting to both the inner and outer surfaces 60, 62 (e.g. via welding) may provide a stronger connection between the torsion shaft 30 and spool 22 or locking mechanism 42. Furthermore, this dual connection may permit a torsion shaft 30 with a smaller diameter.

The torsion shaft 30 may have a circular, e.g. substantially circular, cross-section with the inner surface 60 and/or outer surface 62 of the torsion shaft 30 having a circular cross-section. However, the torsion shaft 30 may have a non-circular cross-section with inner and/or outer surfaces 60, 62 of the torsion shaft having a non-circular cross-section. It is also envisaged that the outer surface 62 of the torsion shaft 30 may have a circular cross-section and the inner surface 60 may have a non-circular cross-section or vice versa. In the particular example shown in FIG. 2b, the torsion shaft 30 may have inner and outer longitudinally extending projections 64, 66, e.g. ribs, on the inner and outer surfaces 60, 62 respectively. By way of example, the inner and/or outer surfaces 60, 62 of the torsion shaft may have a star profile (such as Torx®) with a plurality of projections distributed circumferentially about the torsion shaft. The inner projections 64 may help locate the container 54 in the torsion shaft cavity 50. The outer projections 66 may help locate the torsion shaft 30 with respect to the spool 22. The inner and/or outer projections 60, 62 may also help control deformation of the torsion shaft 30.

In addition to or instead of the projections 64, 66, the container 54 may have one or more ribs to locate the container with respect to the inner surface 60 of the cavity 50. A filler material, such as a foam, may be provided in a space between the container 54 and the cavity inner surface 60. The ribs, inner projections 64 and/or filler material may reduce relative movement of the container 54 and the torsion shaft 30 and may thus reduce rattling.

The torsion shaft 30 may comprise a vent 70 that may permit the flow of fluid 52 from the cavity 50. The vent 70 may be configured to open as the torsion shaft 30 deforms during the impact event. The vent 70 may restrict the flow of the fluid 52. The vent 70 may be provided on a wall of the torsion shaft, e.g. on a side wall or an end wall, and may be in fluidic communication with the cavity 50. Alternatively, the vent 70 may be provided on a wall of the container 54 in which the fluid 52 is held.

The vent 70 may substantially prevent the fluid 52 from leaking out when the vent is closed. The vent may comprise a pressure sensitive opening that opens, e.g. when a pressure of the fluid exceeds a threshold value. Alternatively, the vent 70 may be opened by a remotely triggered device, e.g. such as a pyrotechnic cap. The vent 70 may be configured to close when the pressure of the fluid is lower than the threshold value, e.g. when pressure returns to below threshold value. For example, the vent 70 may comprise a sprung valve closure. The vent 70 may be configured such that the threshold value is adjustable. In an alternative arrangement, the vent 70 may remain open after the vent has been opened. For example, the vent 70 may comprise one or more frangible portions and the vent may burst open when the pressure of the fluid exceeds a threshold value.

During an impact event the torsion shaft 30 may deform due to the torsion force between the spool 22 and locking mechanism 42. The torsion shaft 30 may be supported by the fluid provided in the cavity of the torsion shaft as the torsion shaft deforms during the impact event. The viscosity of the fluid 52 and/or a size of the vent 70 may be selected to provide a desired flow rate of fluid through the vent. For example, the viscosity of the fluid 52 and/or the size of the vent 70 may be selected to permit buckling (e.g. early buckling) of the torsion shaft 30 after the impact event and to subsequently support the torsion shaft during further deformation. In particular, the viscosity of the fluid 52 and/or the size of the vent 70 may be selected such that the support to the torsion shaft progressively increases or decreases as the torsion shaft deforms. As a result, a highly configurable torsion shaft 30 is provided.

The torsion shaft 30 may be installed as part of the seat belt retractor assembly 12. The torsion shaft 30 may also be retrofitted to an existing seat belt retractor assembly 12.

It will be appreciated by those skilled in the art that although the disclosure has been described by way of example, with reference to one or more examples, it is not limited to the disclosed examples and alternative examples may be constructed without departing from the scope of the disclosure as defined by the appended claims.

The invention claimed is:

1. A seatbelt retractor assembly, comprising:
a seat belt;
a spool receiving the seatbelt;
a locking mechanism;
a torsion shaft connected at a first location to the spool and connected at a second location to the locking mechanism, the first and second locations being spaced apart along a length of the torsion shaft;
the torsion shaft being configured to deform when a torsion force is applied between the first and second locations during an impact event; and
the torsion shaft including a cavity and a fluid in the cavity so as to support the torsion shaft as the torsion shaft deforms during the impact event.

2. The seat belt retractor assembly of claim 1, further comprising a vent configured to open as the torsion shaft deforms during the impact event and restrict flow of the fluid.

3. The seat belt retractor assembly of claim 2, wherein the vent includes a pressure sensitive opening that opens when a pressure of the fluid exceeds a threshold value.

4. The seat belt retractor assembly of claim 3, wherein the vent is configured such that the vent closes when the pressure of the fluid is lower than the threshold value.

5. The seat belt retractor assembly of claim 3, wherein the vent is configured such that the threshold value is adjustable.

6. The seat belt retractor assembly of claim 1, wherein the viscosity of the fluid and/or a size of the vent are selected to provide a desired flow rate of fluid through the vent.

7. The seat belt retractor assembly of claim 6, wherein the viscosity of the fluid and/or the size of the vent are designed to permit buckling of the torsion shaft after the impact event and to subsequently support the torsion shaft during further deformation.

8. The seat belt retractor of claim 7, wherein the viscosity of the fluid and/or the size of the vent are designed such that the support to the torsion shaft progressively increases or decreases as the torsion shaft deforms.

9. The seat belt retractor assembly of claim 2, wherein the vent is provided on a wall of the torsion shaft.

10. The seat belt retractor assembly of claim 1, further comprising a container in the cavity and the fluid is held in the container.

11. The seat belt retractor assembly of claim 10, wherein the container is a flexible bladder.

12. The seat belt retractor assembly of claim 10, wherein the container is semi-rigid.

13. The seat belt retractor assembly of claim 10, wherein the container has one or more ribs to locate the container with respect to an internal surface at least partially defining the cavity.

14. The seat belt retractor assembly of claim 10, further comprising a filler material in a space between the container and an internal surface at least partially defining the cavity.

15. The seat belt retractor assembly of claim 10, further comprising a vent configured to open as the torsion shaft deforms during the impact event and restrict flow of the fluid, the vent being provided on a wall of the container.

16. The seat belt retractor assembly of claim 1, wherein the torsion shaft is substantially tubular.

17. The seat belt retractor assembly of claim 1, wherein the torsion shaft includes an opening at a first end, the opening leading to the cavity.

18. The seat belt retractor assembly of claim 1, wherein the torsion shaft at least partially has a non-circular cross-section.

19. The seat belt retractor assembly of claim 1, wherein the torsion shaft has longitudinally extending projections on an internal surface and/or an external surface.

20. The seat belt retractor assembly of claim 1, further comprising a boss at the second end of the torsion shaft, the boss connecting to the spool or locking mechanism, wherein the boss connects to both internal and external surfaces of the torsion shaft.

* * * * *